(12) United States Patent
Mitrov et al.

(10) Patent No.: US 12,105,706 B2
(45) Date of Patent: Oct. 1, 2024

(54) CONTEXT-AWARE DATA REQUESTS FOR A SERVICE IN A DISTRIBUTED ENVIRONMENT

(71) Applicant: VMware LLC, Palo Alto, CA (US)

(72) Inventors: Petar Mitrov, Sofia (BG); Ivan Nushev, Sofia (BG); Mihail Mihaylov, Sofia (BG); Ventsyslav Raikov, Sofia (BG)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/095,309

(22) Filed: Jan. 10, 2023

(65) Prior Publication Data

US 2024/0232193 A1     Jul. 11, 2024

(51) Int. Cl.
*G06F 16/2453*     (2019.01)
(52) U.S. Cl.
CPC .............. *G06F 16/24542* (2019.01)
(58) Field of Classification Search
None
See application file for complete search history.

(56) References Cited

U.S. PATENT DOCUMENTS

| 9,619,257 B1* | 4/2017 | Aron | G06F 3/064 |
|---|---|---|---|
| 10,678,192 B1* | 6/2020 | Allocca | G05B 13/024 |
| 2015/0227406 A1* | 8/2015 | Jan | G06F 11/0709 |
| | | | 714/37 |
| 2022/0398073 A1* | 12/2022 | Chopra | G06F 8/65 |

* cited by examiner

*Primary Examiner* — Amresh Singh
(74) *Attorney, Agent, or Firm* — King Intellectual Asset Management

(57) ABSTRACT

The disclosure provides an approach for database query management. Embodiments include receiving, by a service operating on a server, a request for data stored in a database. Embodiments also include determining, by the service, whether to handle the request as an internal request or an external request. Embodiments include, in response to determining to handle the request as an internal request: sending, by the service, a query for at least a portion of the data to the database; receiving, by the service, the at least the portion of the data, and storing query metadata of the request in local memory of the server and not in the database, the query metadata comprising parameters of the request.

20 Claims, 3 Drawing Sheets

CONTEXT-AWARE DATA REQUESTS FOR A SERVICE IN A DISTRIBUTED ENVIRONMENT

BACKGROUND

A service, such as a provisioning service, may expose an application programming interface (API) to allow computing entities (e.g., other services, virtual computing instances, server, clients, etc.) to submit requests for data that the service uses for operating. For example, a provisioning service may be a service configured to provision endpoints with patches, updates, and/or other configuration information. The provisioning service may utilize data stored in a database to perform its function. For example, the data may include data related to patches, updates, and/or other configuration information. The API may allow the computing entities to request such data stored in the database. A requesting computing entity may be referred to as a requestor.

For example, a provisioning service may be configured to provision subnets for a cloud computing environment. Data regarding the subnets may be stored in a database accessible by the provisioning service. A tenant of the cloud computing environment may, via a computing device, submit a request for the data regarding the subnets via an API exposed by the provisioning service. Accordingly, the provisioning service submits a query to the database for the requested data based on the request, and the database responds to the provisioning service query with the requested data. The provisioning service may then respond to the tenant request with the requested data. A request, as discussed herein, may refer to a request for data made to the service made from a requestor to an API exposed by the service using a syntax defined by the API. A query, as discussed herein, may refer to a query made by the service to the database using a syntax set forth by the database.

In certain aspects, the requested data set may be large. To avoid the provisioning service and the requestor being overwhelmed with all the data of such a large data set at once, the provisioning service may be configured by the requestor to query only a fixed amount of data (e.g., 100 records) at a time from the database. The fixed amount of data is sometimes referred to as "a page" of data. The process of querying pages of data at a time from the database is sometimes referred to as pagination. The pages of data can then be individually delivered to the requestor.

Initially, the requestor, via the API, makes a request that sets forth request parameters describing which data in the database is to be returned. The request parameters may include, for example, fields in the database to be search and/or keywords or filter expressions to be used to search. The requestor may also specify, as part of the request parameters, the page parameters (such as page size, etc.) (also referred to as page settings) of the page(s) of data to be returned, and if multiple pages exist, which page to initially return. The request may be, for example, in a syntax defined by the API. The provisioning service receives the request. The provisioning service generates a query, based on the request parameters, in the syntax used by the database (sometimes referred to as an "executable query statement"). The provisioning service also generates metadata regarding the request that is useful for future follow-up requests from the requestor (e.g., query filters, sorting, grouping, page size, offset, etc.). The provisioning service performs a query on the database and retrieves up to a page of data. The provisioning service then updates the metadata based on the retrieved data. For example, to update the offset, the provisioning service may determine whether there is additional data stored at the database corresponding to the request based on the amount of data returned as the first data in the query response. For example, if the amount of data returned is less than a page (e.g., no data or some data but less than a page of data), then there is no additional data stored at the database corresponding to the request and the offset is not updated. If the amount of data returned is equal to a page, then there may be additional data stored at the database corresponding to the request and the offset in incremented by the page size.

To help provide continuity, the provisioning service stores the corresponding metadata in the database. For example, in a distributed system, because the same provisioning service instance may not handle follow-up requests from the requestor, storing this metadata in a shared database facilitates another provisioning service instance handling the follow-up request. Additionally, because it is unknown how long the requestor may continue to make follow-up requests, storing this metadata in the database facilitates continuing to handle the request even when an event (e.g. restart of the service) affects the memory of the provisioning service.

The provisioning service, in a request response, provides the page of data (also referred to as a query page) and a value that identifies where the query metadata (also referred to as query page metadata or query pages metadata) is stored in the database and an indicator whether there is at least an additional page of data responsive to the request. The value that identifies where the metadata is stored in the database is sometimes referred to as a "pointer."

Subsequently, the requestor may make a follow-up request for data responsive to the initial request. In the follow-up request, the requestor provides the pointer.

In response to the follow-up request, the provisioning service retrieves the metadata from the database based on the pointer. The provisioning service then queries the database for the page of data indicated in the follow-up request. As before, the provisioning service updates the metadata and stores it in a new record in the database. The provisioning service, in a request response, provides the requested page of data and a new pointer if there is at least an additional page of data responsive to the request. This process may continue until the requestor stops making follow-up requests. The requestor may request already retrieved pages by referring to the corresponding pointer provided in a prior request response.

In such a manner, the requestor can navigate the responsive data page-by-page. After receiving the first page of data, the requestor may send a request for the next page of data corresponding to the original request to the provisioning service. To obtain the next page, the provisioning service executes three database operations: (i) pull the metadata for the current query page, (ii) execute the query to retrieve the desired query page, and (iii) create new metadata record into the database.

During periods of heavy loads, queries to the database increase tremendously and creation and tracking of query pages represent a significant amount of these queries. Accordingly, there is a need in the art for improved techniques for handling database requests.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
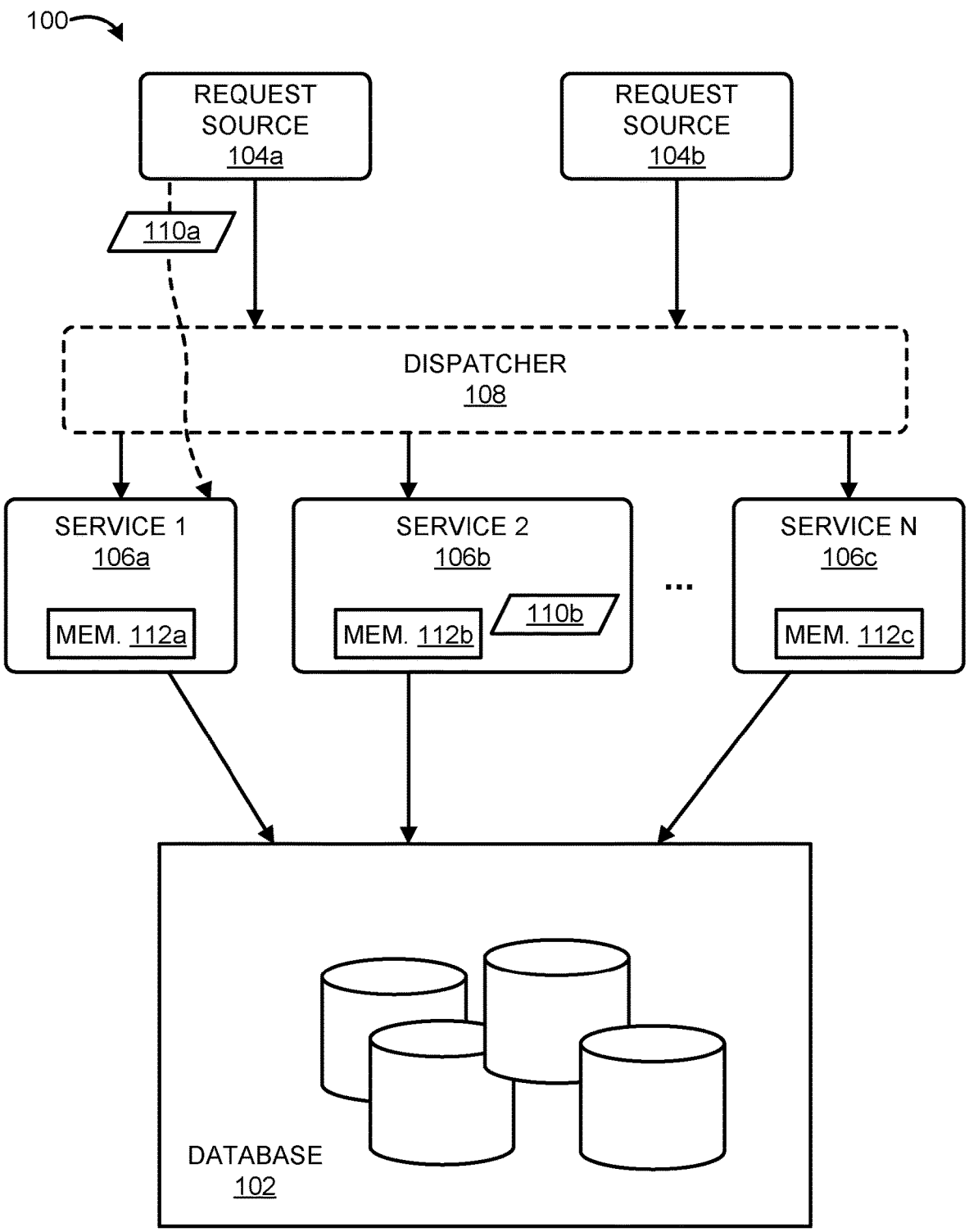
FIG. 1 depicts example physical and virtual network components with which embodiments of the present disclosure may be implemented.

The present disclosure provides improved systems and methods for handling internal database requests and external database requests to conserve resources used for external database requests. An internal database request refers to a request made to an API exposed by a service, where the request is generated and issued locally to where the service is running, such as by the service itself (sometimes referred to as a "local request"). An external database request refers to a request made to the API exposed by the service, where the request is generated and issued from a source external to where the service is running, such as a request made over a network (sometimes referred to as a "persistent request"). Though certain aspects are discussed with respect to a provisioning service, as an example, the techniques discussed herein may be utilized for any suitable service.

External requests have different considerations from internal requests. In a distributed system, many copies or "instances" of the provisioning service may be operating to, for example, distribute the network traffic and computational load related to servicing requests. However, in the distributed system, it cannot be guaranteed that a follow-up request for a page of the records responsive to the request by an external requestor will be handled by the same copy of the provisioning service that handled the initial request. Additionally, any provisioning service instance may crash or otherwise fail. To overcome these issues and provide continuity to the requestor, query metadata for a request response is stored in a database that is accessible to the provisioning service instances. During periods of heavy usage, requests for query metadata can cause a burden on the databases and cause degradation of the whole system. Additionally, because it is not known when the requestor is finished iterating through the pages, the stored query metadata related to the request are deleted on expiration time. During periods of heavy usage, this can cause storage related to tracking page data to massively increase. Therefore, to improve operation of the database(s), it is desirable to reduce queries to the database for query metadata in response to requests and reduce the amount of query metadata stored where possible.

Sometimes, internal services, such as provisioning services, may make requests to the API and corresponding queries to the database for data for internal functions. These internal services may be micro services that run in a separate process that provide a number of support functions. Provisioning services may, in addition to providing an API to query the database, provide additional internal functions such as scheduled batch processing of data, and data-based calculations, etc. When these internal functions of the provisioning service access the query API to retrieve data from the database, they are considered 'local' clients and are routed to the same instance of the provisioning service as the one they reside in. For example, there may be a data collection function that runs inside the provisioning service that periodically (e.g., every ten minutes) compares the inventory in a public or private cloud with the inventory in the local database. In such an example, the data collection function uses the query API with local requests.

A provisioning service that makes an internal request for a page of the records has different concerns than the external requestor. For example, the provisioning service instance that makes the original request will be the same provisioning service instance that makes follow-up requests. Additionally, internal services do not need continuity. If a provisioning service crashes, the query metadata is no longer needed as additional page data corresponding to the initial request is no longer needed by the provisioning service. As another example, the provisioning service may only need data for a short period of time. As such, data retrieved from the database following an internal request does not require the persistence of the query metadata in the database. Additionally, it is desirable that these internal requests and queries minimize burden on the databases to conserve resources for external requestors during periods of heavy loads. Accordingly, query metadata for an internal request may be stored in non-persistent memory instead of a database. For example, the query metadata for an internal request may be stored in local memory accessible by the provisioning service instance.

As described herein, the provisioning services distinguish between external requests and internal requests. In some example, a provisioning service determines an initiator of the request, such as based on information in a packet header associated with the request, to determine whether the request is an internal or external request. In some examples, an API request for data from a database may include an indicator (e.g., a flag or a variable) that indicates whether the request is to be handled as an external request or an internal request. When the request is an external request, the provisioning services store request-related query metadata (e.g., data filters, data ordering, grouping, page size, page offset, the indicator of the next query page, the indicator of previous query page, etc.) in a database or persistent store that is accessible to the provisioning service. When the request indicates that it is an internal request, the provisioning services store request-related query metadata in local memory accessible by the specific provisioning service. While the terms "internal" and "external" are used herein to distinguish the API requests, in some examples, any requestor may flag a request as internal or external regardless of the requestor's relationship to the databases. The handling of internal requests reduce reliance on the databases and improve the performance of the system.

FIG. 1 illustrates components of system 100 in which embodiments of the present disclosure may be implemented.

In the illustrated example, the system 100 includes a database 102, one or more request sources 104*a* and 104*b* (collectively "request sources 104"), and one or more database management services 106*a*, 106*b*, and 106*c* (collectively "database management services 106"). The database management services 106 are sometimes referred as "provisioning services." In certain aspects, each database management service 106 is an instance of a particular database management service, as opposed to its own individual service. Though multiple request sources 104 and multiple database management services 106 are shown, there may be any number of data sources or database management services in system 100. In the illustrated example, the system 100 also includes a dispatcher 108.

The database 102 may include any suitable non-volatile data store for organizing and storing data. In some examples, the database 102 may be implemented as software-defined storage such as VMware Virtual SAN that clusters together server-attached hard disks (HDDs) and/or solid state drives (SSDs) to create a flash-optimized, highly resilient shared datastore designed for virtual environments. In some examples, the database 102 may be implemented as one or more storage devices, for example, one or more hard disks, flash memory modules, solid state disks, and optical disks (e.g., in a computing device, server, etc.). In some examples, the database 102 may include a shared storage system having one or more storage arrays of any type such as a network-attached storage (NAS) or a block-based device over a storage area network (SAN).

The database 102 may store, for examples, data where multiple database records are responsive to requests 110a or 110b (collectively "requests 110"). For example, the database 102 may store a record for each subnet in a network. The initial requests 110 include request parameters to identify which records the request source 104 desires and, in some examples, page settings that specify how the request source 104 desires the query pages including the records to be formatted in the response. As discussed below, the database management services 106 are configured to query the database 102 based on the requests 110, such as by formulating a query for a page of data corresponding to the data requested in a request 110. The database 102 returns a query page corresponding to the queried page of data, and the database management services 106 sends the returned query page in a request response to the request source. The database 102 stores query page metadata for the queries corresponding to external requests 110a. For example, the database 102 may store, along with an identifier associated with a specific request, (i) the query parameters, (ii) page settings (e.g., sorting and/or grouping parameters, a page size and offset, etc.), and/or (iii) a final executable parametrized query statement to facilitate retrieving query pages responsive to an external request 110a. As such, follow-up requests for an additional query page of data do not require the initial query parameters or the page settings to get the desired query page.

The request source 104 may correspond to any services or applications that access the database 102 via an API provided by the database manager services 106. The API may conform to, for example, constraints of the Representational State Transfer (REST) architectural style. The request source 104 may operate on one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. The request source 104 may generate external requests 110a that request data stored on the database 102. For example, the request source 104a may be a cloud services provider adapter and the external request 110a may request all subnets in a network related to the cloud service. After receiving a request response from one of the database management services 106, the request source 104a may send follow-up requests for pages of data responsive to the corresponding external request 110a based on information received from the database management services 106 (e.g., a pointer indicating where the associated query metadata is stored in the database 102, etc.).

The database management service 106 may be a process or application executing on one or more physical devices or virtual devices. In the illustrated example, each of the database management services 106 have access to a corresponding non-static memory 112a, 112b, and 112c (collectively "memory 112"). The memory 112 may store query pages metadata for the internal requests 110b. For example, the memory 112 may store, along with an identifier associated with a specific query, query filters, sorting, grouping, tenant, page size, offset, and/or a final executable parametrized query statement, etc. to facilitate retrieving query pages responsive to an internal request 110b. In some examples, query pages metadata are stored in the memory 112 in a concurrent hash map. The database management service 106 may, from time-to-time, delete the query pages metadata that have not been accessed for a threshold period of time (sometimes referred to as "expired data."). In some examples, another way for query page metadata to become expired data is when the database management service 106 signals that the query page metadata is no longer needed. In some examples, the database management service 106 may delete expired data every thirty seconds.

The database management services 106 manage access to the database 102. The database management services 106 may be coupled (e.g., via a network, running on the same device, etc.) to the request source 104 and to the database 102. The database manager services 106 expose an API that facilitates accessing the database 102 via the requests 110. For example, the database management services 106 transform requests 110 written in the syntax defined by the API into executable queries written in the syntax used by the database 102. For example, the requests 110 may use the syntax compliant with REST API architecture while the queries may use the syntax of an SQL database. The database management services 106 also manage the database 102 to facilitate pagination. As a consequence, request sources 104 may make external requests 110a without knowledge of the specific implementation of the database 102. Additionally, the database manager services 106 may retrieve data from the database 112 using the same functionality by making internal requests 110b. Differentiating between the external requests 110a and internal requests 110b through the functionality of the API facilitates, for example, the ability to change functions that query the database 102 without causing changes to the functions that use data from the database 102 (e.g., via internal requests 110b). Additionally, such a system allows the request sources 104 to make internal requests 110b if desired. For example, a request source 104a may make an internal request 110b when the desired results are likely to be on the first page of data and the requestor desires a minimum impact to operation of the database.

The database management services 106 provide responses to the requests 110. The requests 110 may have two configurations. An initial request includes request parameters and page settings. A follow-up request includes a pointer previously supplied by the database management services 106. In response to an initial request, the database management services 106 may be configured to (i) generate an executable parametrized query statement, in the syntax used by the database 102, based on request parameters in a request 110, (ii) query the database 102 using the executable parametrized query statement, and (iii) generate and store, in the database 102 or in the memory 112, the responsive query page metadata, such as query filters, sorting, grouping, tenant, page size, and/or page offset. In response to a follow-up request, the database management services 106 may be configured to (i) retrieve the executable parametrized query statement and pagination metadata from the database 102 or memory 112 using the pointer, (ii) query the database 102 using the executable parametrized query statement for the page of data identified by the query page identifier, and (iii) generate and store, in the database 102 or in the memory 112, the responsive query page metadata.

To respond to a request 110, a database management service 106 generates a request response that includes a current page of results and information for the request source 104 to request the next page of results (e.g., the pointer, etc.). From time-to-time, a database management service 106 may generate and execute an internal request 110*b* to retrieve data from the database 102 for internal use. In some examples, another service or process with access to the local memory 112 may generate the internal request 110*b*.

The dispatcher 108 may receive external requests 110*a* generated by a request source 104 and distribute the external requests 110*a* to the various database manager services 106 to, for example, balance computational load and traffic to the respective database manager services 106. For example, during periods of heavy loads, the system 100 may instantiate additional instances of the database manager services 106. The dispatcher 108 facilitates balance management while being opaque to the request source 104. The dispatcher 108 may direct subsequent page requests to a different one of the database manager services 106 than the one of the database manager services 106 that handled the original external request 110*a*.

Figure 2A:
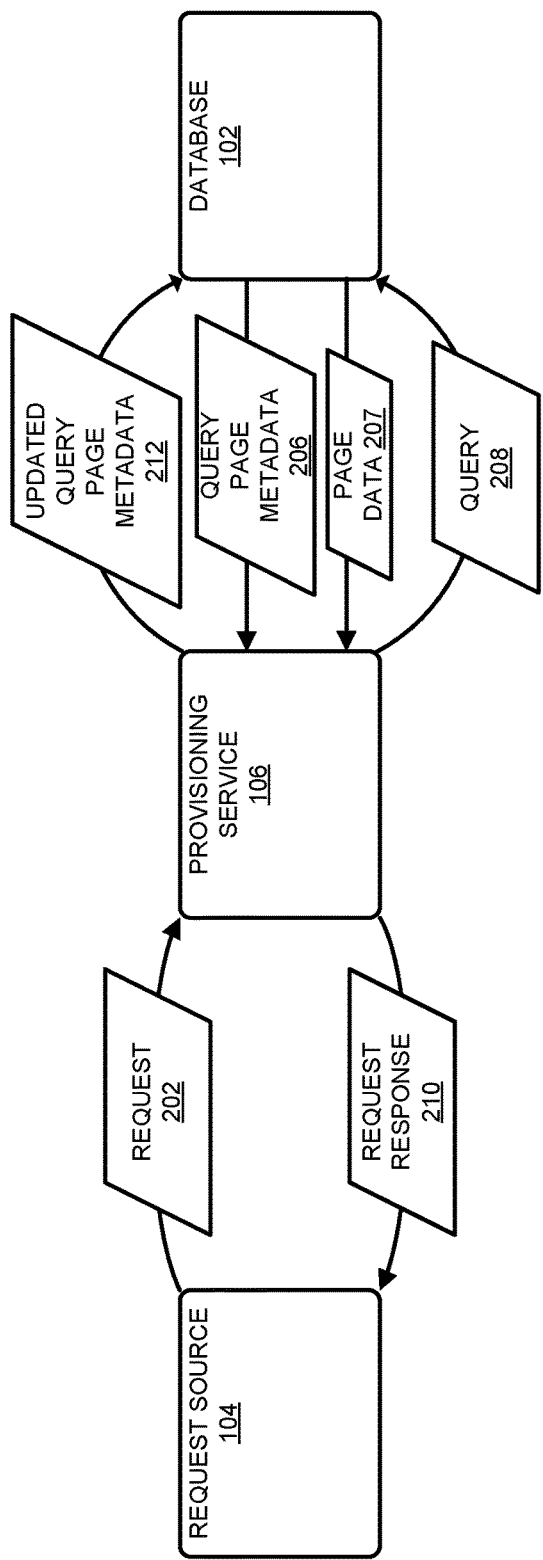
FIG. 2A illustrates a block diagram of an external request for a provisioning service in a distributed environment, according to embodiments of the present disclosure.
Figure 2B:
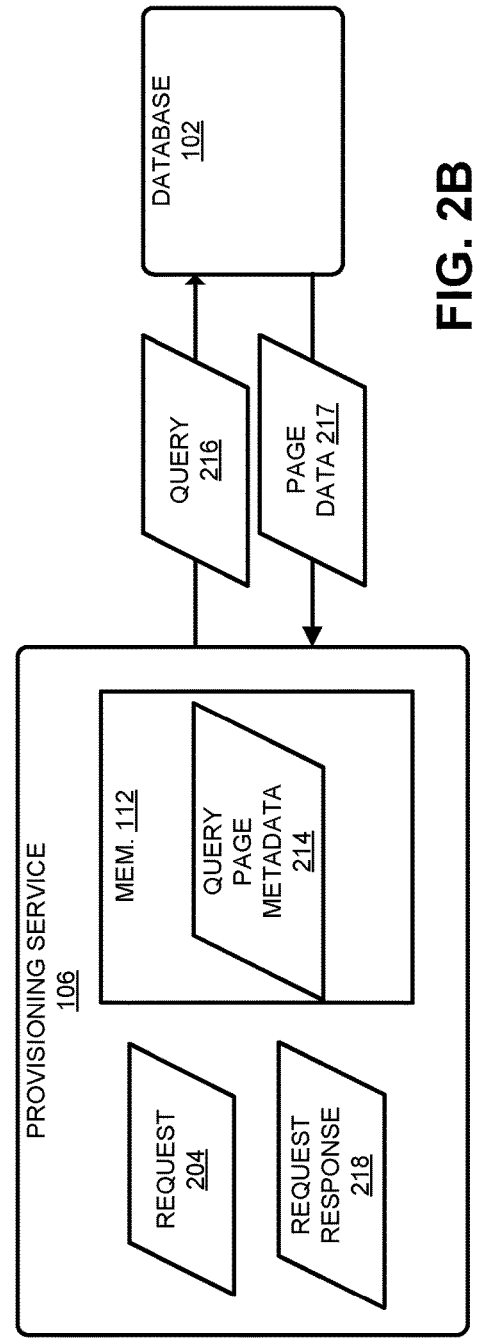
FIG. 2B illustrates a block diagram of an internal request for a provisioning service in a distributed environment, according to embodiments of the present disclosure.
Figure 3:
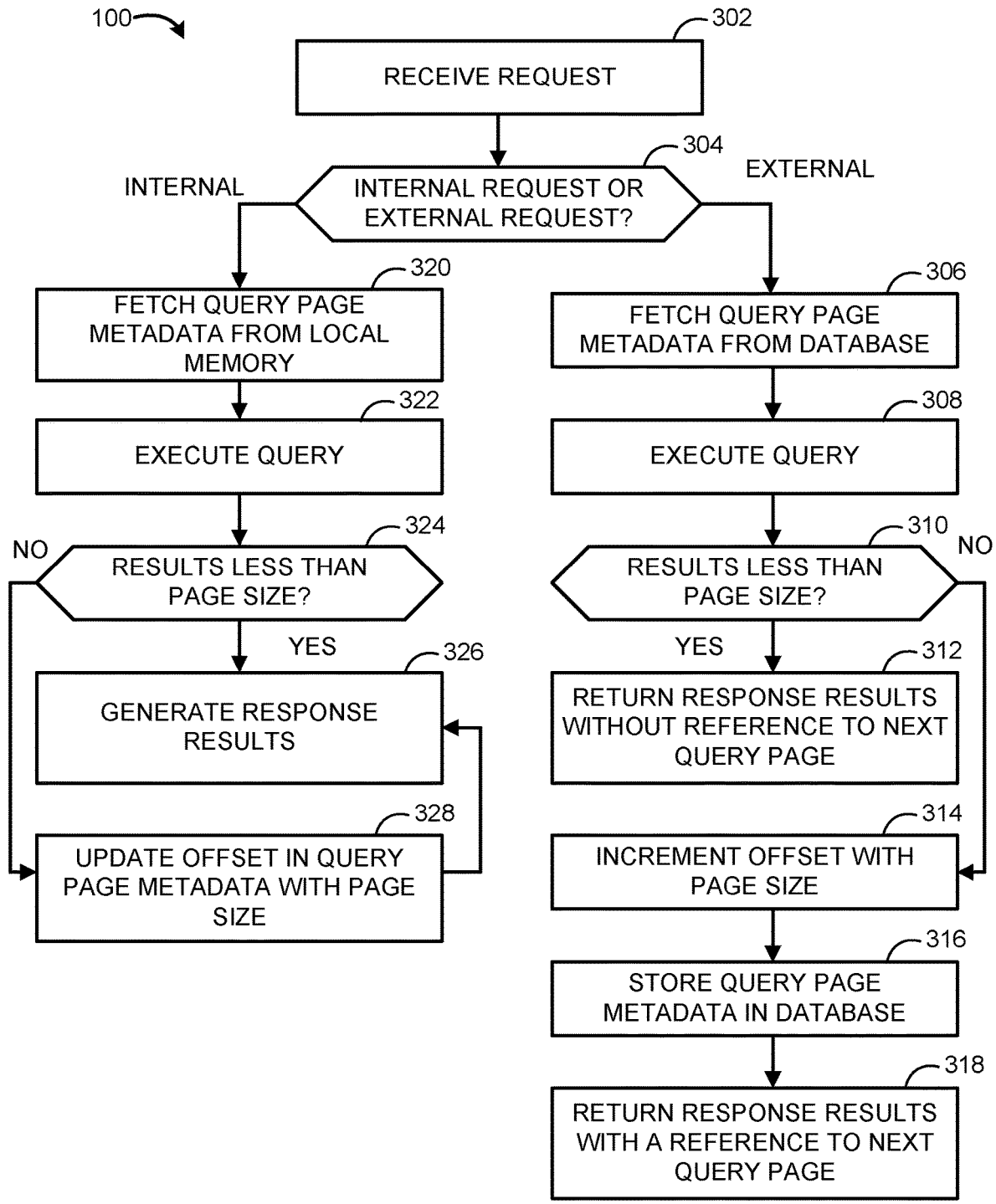
FIG. 3 is a flowchart of an example method for context-aware request for a provisioning service in a distributed environment, according to embodiments of the present disclosure.

Requesting data from the database 102 involves the requestor (e.g., the request source 104 or the database management system 106 (*i*) sending an initial request with request parameters, (i) receiving data comprising a first query page and parameters to request the next query pages, and (iii) sending a follow-up request that identifies the next page without including the initial request parameters. FIG. 2A illustrates a block diagram of handling an external request 110*a*. FIG. 2B illustrates a block diagram of handling an internal request 110*b*. FIG. 3 is a flowchart of an example method for context-aware handling of requests 202 and 204. The operations 300 of FIG. 3 are described in conjunction with the block diagrams of FIGS. 2A and 2B.

The operations 300 being at step 302 with receiving, by the database management service 106, a request. The request may, for example, include request parameters (e.g., for an initial request) or a pointer and an indicator of the desired query page (e.g., for follow-up requests).

The operations 300 continue to step 304 with determining, by the database management service 106, whether the request is an external request 110*a* or an internal request 110*b*. For example, the request may include a field or a flag that indicates whether it is an external request 110*a* or an internal request 110*b*. In some examples, the database management service 106 may infer whether the request is an external request 110*a* or an internal request 110*b* based on the source of the request.

When the request is an external request 110*a*, the operations 300 continue to step 306 with fetching, by the database management service 106, query page metadata 206 associated with the external request 110*a* from the database 102 when, for example, the request is not an initial request (e.g., as illustrated in FIG. 2A).

The operations 300 continue at step 308 with the database management service 106 executing a query 208 to the database 102 to get the set of records that correspond to the page of data being sought, shown as page data 207 in FIG. 2A. In particular, database management service 106 sends query 208 to database 102, and database 102 sends page data 207 to database management service 106, in response. For example, for an initial request, the set of records may correspond to a first page of data, and for a follow-up request, the set of records may correspond to a second page of data.

The operations continue at step 310 with determining, by the database management service 106, if the number of records in page data 207 retrieved at step 306 is less than the page size. A number of responsive records being less than the page size means that there are no more pages to fetch from the database 102 and thus a request response 210 does not include an indicator of a next query page. A number of responsive records being equal to the page size implies there can be more pages.

When the number of responsive records is less that the page size, the operations 300 continue at step 312 with returning, by the database management service 106, the request response 210 to the request source 104 without an indicator to the next query page, such as without a pointer to query page metadata.

When the number of responsive records is not less that the page size, the operations 300 continue at step 314 with updating, by the database management service 106, the query page metadata to reflect the location of the next query page (e.g., by incrementing a page offset with the page size, etc.).

The operations 300 continue at step 316 with storing, by the database management service 106, the updated query page metadata 212 as a new record in the database 102.

The operations 300 continue at step 318 with returning, by the database manager service 106, the request response 210 to the request source 104. The request response 210 includes the page data fetched at step 308, and a pointer indicating the location of the updated query page metadata 212 stored at step 316.

Returning to step 304, when the request is an internal request 110*b*, the operations 300 continue to step 320 with retrieving, by the database management service 106, query page metadata 214 associated with the internal request 110*b* from the memory 112 of the database management service 106 when, for example, the request is not an initial request (e.g., as illustrated in FIG. 2B).

The operations 300 continue at step 322 with the executing, by the database management service 106, a query 216 to get the set of records that correspond to the page of data being sought, shown as page data 217. In particular, database management service 106 sends query 216 to database 102, and database 102 sends page data 217 to database management service 106, in response.

The operations continue at step 324 with determining if the number of records in page data 217 retrieved at step 322 is less than the page size.

When the number of responsive records is less that the page size, the operations 300 continue at step 326 with generating, by the database management service 106, a request response 218. The request response 218 may then be used by the database management service 106.

When the number of responsive records is not less that the page size, the operations 300 continue at step 328 with updating, by the database management service 106, the query page metadata 214 in the memory 112 (or storing the updated query page metadata as a new record, and retaining the previous query page metadata 214) to reflect the existence of a next query page (e.g., by incrementing a page offset with the page size, etc.).

The operations continue at step 326 with generating, by the database management service 106, a request response 218. The request response 218 may then be used by the database management service 106.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
receiving, by a service operating on a server, a plurality of requests for data stored in a database, the plurality of requests comprising a first request, received from a first requestor, for first data and a second request, received via an API from a second requestor, for second data;
determining, by the service, to handle the first request as an internal request;
in response to determining to handle the request as an internal request:
sending, by the service, a first query for at least a portion of the first data to the database;
receiving, by the service, the at least the portion of the first data; and
storing first query metadata of the request in local memory of the server and not in the database, the first query metadata comprising parameters of the first request;
determining, by the service, to handle the second request as an external request;
in response to determining to handle the second request as an external request:
sending, by the service, a second query for at least a portion of the second data to the database;
receiving, by the service, the at least the portion of the second data;
storing second query metadata of the second request in the database; and
providing the at least the portion of the second data and a pointer to the second query metadata stored in the database to the second requestor.

2. The method of claim 1, wherein the first request is received via the API.

3. The method of claim 1, further comprising:
receiving a first follow-up request from the first requestor;
in response to receiving the first follow up request:
retrieving, from the local memory, a first parameterized query statement and first pagination metadata; and
querying the database using at least the first parameterized query statement and first pagination metadata;
receiving a first follow-up request from the first requestor;
in response to receiving the second follow up request:
retrieving, from database, a second parameterized query statement and second pagination metadata; and
querying the database using at least the second parameterized query statement and second pagination metadata.

4. The method of claim 1, further comprising deleting the first query metadata from the local memory.

5. The method of claim 1, further comprising determining whether to handle each of the plurality of requests as an internal request or an external request based on one or more of:
a source of that request; or
an indicator in the request indicating how the request should be handled.

6. The method of claim 1, wherein each of the first requestor and the second requestor is a source external to the server.

7. The method of claim 1, wherein each of the first requestor and the second requestor is a source internal to the server.

8. A system comprising:
one or more processors; and
non-transitory computer-readable medium storing instructions executable by the one or more processors to perform operations comprising:
receiving, by a service operating on the system, a plurality of requests for data stored in a database, the plurality of requests comprising a first request, received from a first requestor, for first data and a second request, received via an API from a second requestor, for second data;
determining, by the service, to handle the first request as an internal request;
in response to determining to handle the request as an internal request:
sending, by the service, a first query for at least a portion of the first data to the database;
receiving, by the service, the at least the portion of the first data; and
storing first query metadata of the request in local memory of the server and not in the database, the first query metadata comprising parameters of the first request;
determining, by the service, to handle the second request as an external request;
in response to determining to handle the second request as an external request:
sending, by the service, a second query for at least a portion of the second data to the database;
receiving, by the service, the at least the portion of the second data;
storing second query metadata of the second request in the database; and
providing the at least the portion of the second data and a pointer to the second query metadata stored in the database to the second requestor.

9. The system of claim 8, wherein the first request is received via the API.

10. The system of claim 8, the operations further comprising:
receiving a first follow-up request from the first requestor;
in response to receiving the first follow up request:
retrieving, from the local memory, a first parameterized query statement and first pagination metadata; and
querying the database using at least the first parameterized query statement and first pagination metadata;
receiving a first follow-up request from the first requestor;
in response to receiving the second follow up request:
retrieving, from database, a second parameterized query statement and second pagination metadata; and
querying the database using at least the second parameterized query statement and second pagination metadata.

11. The system of claim 8, the operations further comprising deleting the query metadata from the local memory.

12. The system of claim 8, the operations further comprising determining whether to handle each of the plurality of requests as an internal request or an external request based on one or more of:
a source of that request; or
an indicator in the request indicating how the request should be handled.

13. The system of claim 8, wherein each of the first requestor and the second requestor is a source external to the system.

14. The system of claim 8, wherein each of the first requestor and the second requestor is a source internal to the system.

15. A non-transitory computer-readable medium storing instructions executable by one or more processors of a server to perform operations comprising:
   receiving, by a service operating on the server, a plurality of requests for data stored in a database, the plurality of requests comprising a first request, received from a first requestor, for first data and a second request, received via an API from a second requestor, for second data;
   determining, by the service, to handle the first request as an internal request;
   in response to determining to handle the request as an internal request:
      sending, by the service, a first query for at least a portion of the first data to the database;
      receiving, by the service, the at least the portion of the first data; and
      storing first query metadata of the request in local memory of the server and not in the database, the first query metadata comprising parameters of the first request;
   determining, by the service, to handle the second request as an external request;
   in response to determining to handle the second request as an external request:
      sending, by the service, a second query for at least a portion of the second data to the database;
      receiving, by the service, the at least the portion of the second data;
      storing second query metadata of the second request in the database; and
   providing the at least the portion of the second data and a pointer to the second query metadata stored in the database to the second requestor.

16. The computer-readable medium of claim 15, wherein the first request is received via the API.

17. The computer-readable medium of claim 15, the operations further comprising deleting the query metadata from the local memory.

18. The computer-readable medium of claim 15, the operations further comprising determining whether to handle the request as an internal request or an external request based on one or more of:
   a source of the request; or
   an indicator in the request indicating how the request should be handled.

19. The computer-readable medium of claim 15, wherein each of the first requestor and the second requestor is a source external to the server.

20. The computer-readable medium of claim 15, wherein each of the first requestor and the second requestor is a source internal to the server.

\* \* \* \* \*